United States Patent
Tanada et al.

(10) Patent No.: US 7,712,303 B2
(45) Date of Patent: May 11, 2010

(54) DEGRADATION ESTIMATING APPARATUS FOR UNBURNED COMPONENT ADSORPTION CATALYST

(75) Inventors: Hiroshi Tanada, Nagoya (JP); Yasuyuki Hatsuda, Okazaki (JP); Takehisa Fujita, Kariya (JP); Takaharu Hashimoto, Nagoya (JP); Keisuke Tashiro, Okazaki (JP); Mizuki Anai, Anjo (JP); Mitsutaka Kojima, Okazaki (JP); Masayuki Yamashita, Kyoto (JP); Katsuhiko Miyamoto, Kyoto (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 495 days.

(21) Appl. No.: 11/407,186

(22) Filed: Apr. 20, 2006

(65) Prior Publication Data

US 2006/0236678 A1 Oct. 26, 2006

(30) Foreign Application Priority Data

Apr. 22, 2005 (JP) ............................ 2005-125394

(51) Int. Cl.
*F01N 3/00* (2006.01)
(52) U.S. Cl. .................. 60/277; 60/276; 60/285; 60/297; 60/303; 123/198 F; 123/481
(58) Field of Classification Search .................. 60/276, 60/277, 284, 297, 303, 285, 295; 123/198 F, 123/481
See application file for complete search history.

(56) References Cited

U.S. PATENT DOCUMENTS

| | | | | |
|---|---|---|---|---|
| 5,524,433 | A * | 6/1996 | Adamczyk et al. | 60/276 |
| 6,324,893 | B1 * | 12/2001 | Watanabe et al. | 73/23.32 |
| 6,367,245 | B1 * | 4/2002 | Yasui et al. | 60/277 |
| 6,378,296 | B1 * | 4/2002 | Yasui et al. | 60/277 |
| 6,389,804 | B1 * | 5/2002 | Yasui et al. | 60/277 |
| 6,401,451 | B1 * | 6/2002 | Yasui et al. | 60/277 |
| 6,874,313 | B2 * | 4/2005 | Yurgil et al. | 60/277 |
| 6,901,741 | B2 * | 6/2005 | Kobayashi et al. | 60/274 |
| 7,168,237 | B2 * | 1/2007 | Ueda et al. | 60/277 |
| 7,325,393 | B2 * | 2/2008 | Miura | 60/277 |

FOREIGN PATENT DOCUMENTS

| | | |
|---|---|---|
| JP | 5-195759 A | 8/1993 |
| JP | 6-81635 A | 3/1994 |
| JP | 8-177469 A | 7/1996 |
| JP | 9-32609 A | 2/1997 |
| JP | 2000-248979 A | 9/2000 |
| JP | 2003-41991 A | 2/2003 |
| JP | 2004-60587 A | 2/2004 |

* cited by examiner

*Primary Examiner*—Tu M Nguyen
(74) *Attorney, Agent, or Firm*—Birch, Stewart, Kolasch & Birch, LLP (57) ABSTRACT

A degradation estimating apparatus for an unburned fuel component adsorption catalyst, which is connected with an internal combustion engine and has an unburned fuel component adsorbent and an oxygen storage component is provided.

The apparatus includes a degradation estimating unit for making estimation for a degradation of the unburned fuel component adsorption catalyst on the basis of a first term and a second term.

The first term is from the cancellation of the fuel supply to detecting a variation of an upstream side air-fuel ratio occurring due to the increase of the reductant quantity in the exhaust gas.

The second term is from the cancellation of the fuel supply to detecting of a variation of the downstream side air-fuel ratio due to an increase of the reductant quantity.

20 Claims, 8 Drawing Sheets

DEGRADATION ESTIMATING APPARATUS FOR UNBURNED COMPONENT ADSORPTION CATALYST

BACKGROUND OF THE INVENTION (1) Field of the Invention

The present invention relates to a degradation estimating apparatus for an unburned fuel component adsorption (storage) catalyst.

(2) Description of the Related Art

So far, there has been employed a catalyst which is for reducing an exhaust gas exhausted from an engine to the atmosphere. There is a problem which arises with the employment of a catalyst, however, in that the catalyst gradually degrades to show a lower purification performance. For this reason, there is a need to timely estimate the purification performance of the catalyst, i.e., the degree of degradation of the catalyst.

Figure 6:
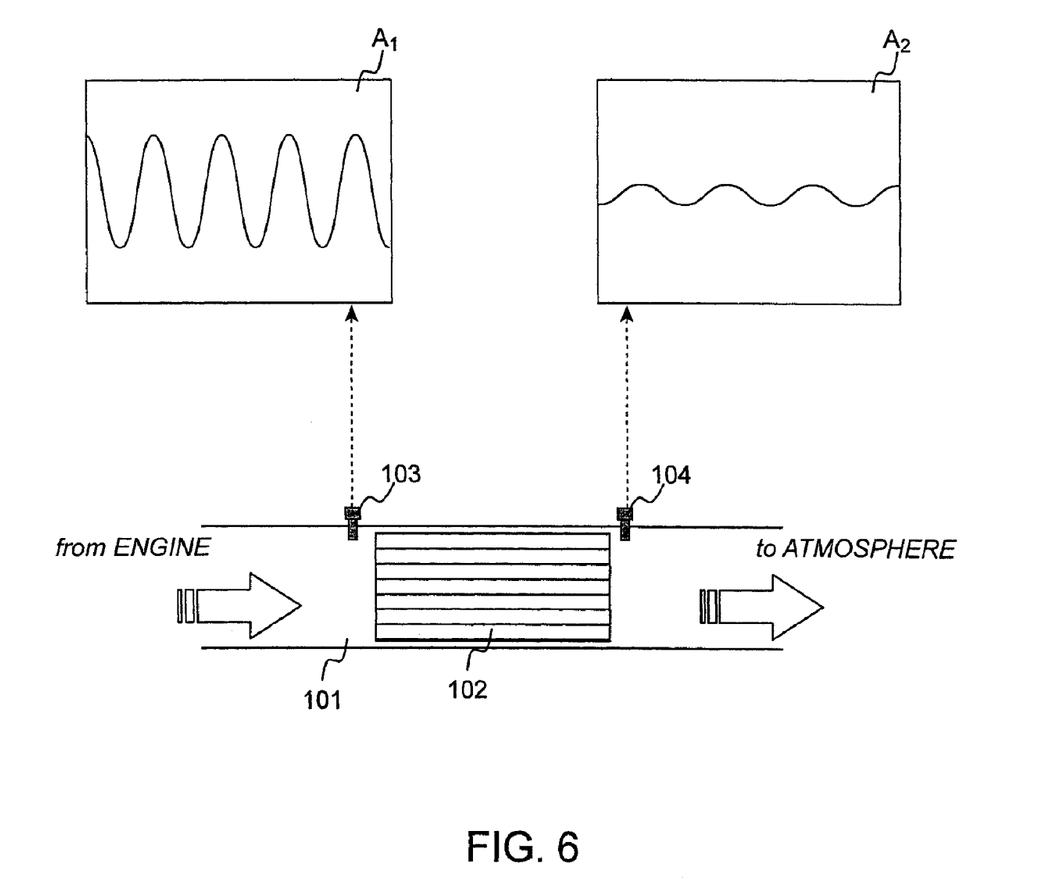
FIG. 6 is a structural view illustratively showing a conventional technique about the catalyst degradation estimation.
Figure 7:
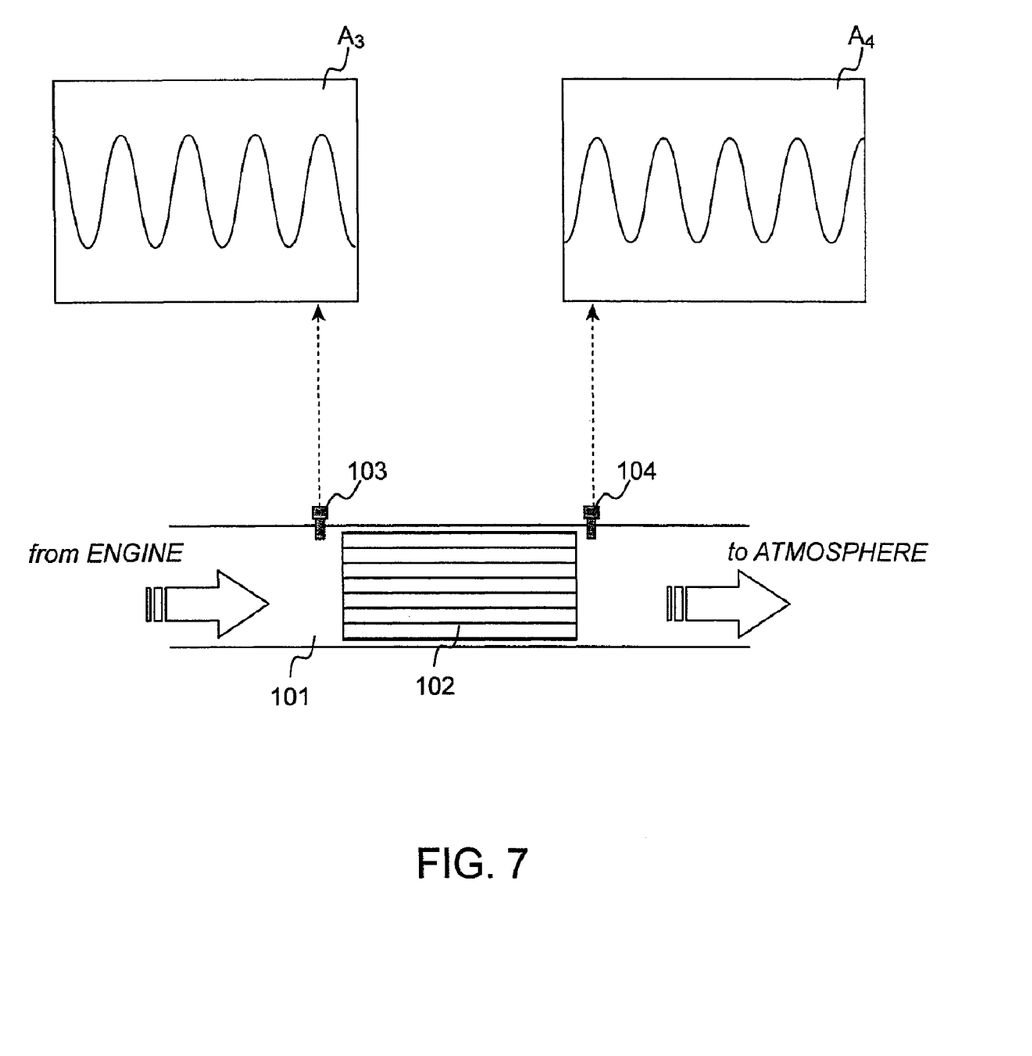
FIG. 7 is a structural view illustratively showing a conventional technique about the catalyst degradation estimation.

As one of the technologies for the estimation on the degree of degradation of the catalyst, there is a technique, for example, shown in FIGS. 6 and 7 and, in this example, an exhaust gas exhausted from an engine (not shown) is purified through the use of a three-way catalyst (TWC) 102 provided in an exhaust passage 101 and then discharged or released to the atmosphere.

In addition, in the exhaust passage 101, $O_2$ sensors 103 and 104 are provided at an entry and exit of the three-way catalyst 102 so as to detect an air-fuel ratio of an exhaust gas flowing into the three-way catalyst 102 and an air-fuel ratio of an exhaust gas exiting from the three-way catalyst 102, respectively.

Still additionally, this three-way catalyst 102 contains an oxygen storage component (hereinafter referred to as an "OSC adsorbent"), thereby adsorbing oxygen contained in the exhaust gas.

Still additionally, it is known that the degree of degradation of the three-way catalyst corresponds to the degree of the OSC adsorbent, and the technique shown in FIGS. 6 and 7 also employs a method of detecting the degree of degradation of the three-way catalyst 102 by detecting the degree of degradation of the OSC adsorbent.

A description will be given hereinbelow of this method. First of all, a fuel injection quantity and others of an engine are varied periodically, thereby periodically varying an air-fuel ratio to be detected by the upstream side $O_2$ sensor 103 (see mark $A_1$ in FIG. 6).

At this time, if the OSC adsorbent functions normally without degrading, when the exhaust gas reaches an oxygen excess atmosphere (lean), the OSC adsorbent adsorbs the oxygen in the exhaust gas while, when the exhaust gas falls into an oxygen shortage atmosphere (rich), the oxygen adsorbed by the OSC adsorbent is discharged into the exhaust gas. That is, owing to this OSC adsorbent, the variation of the air-fuel ratio is suppressible (see mark $A_2$ in FIG. 6).

On the other hand, in a case in which the OSC adsorbent falls into a degradation condition, difficulty is encountered in sufficiently adsorbing and discharging oxygen through the use of the OSC adsorbent, which makes it difficult to suppress the variation of the air-fuel ratio occurring on the upstream side of the three-way catalyst 102 (see marks $A_3$ and $A_4$ in FIG. 7).

As described above, in the example shown in FIGS. 6 and 7, an estimating the degree of degradation of the three-way catalyst 102 can be made on the basis of a difference in detection value between the upstream side $O_2$ sensor 103 and the downstream side $O_2$ sensor 104 in the case of periodically varying the exhaust air-fuel ratio.

Meanwhile, as another example of technologies for the estimating the catalyst purification performance, there exists a technique disclosed in Japanese Patent Laid-Open No. HEI 6-81635 (patent document 1).

This patent document 1 discloses a technique to the effect that an $O_2$ sensor is provided on each of the upstream and down stream sides of a catalyst and, at the fuel return after the reduction fuel cut, an estimating the degradation of the catalyst is made on the basis of a lag of response time until each of the values measured by these $O_2$ sensors exceeds a fixed value.

The technique disclosed in the patent document 1 also employs a technique similar in principle to the method of estimating the degradation of the catalyst on the basis of the degree of degradation of the OSC adsorbent as described with reference to FIGS. 6 and 7. In addition, for enhancing the estimation accuracy, the estimating for the degradation of catalyst is made at the fuel return after the fuel cut.

Figure 8:
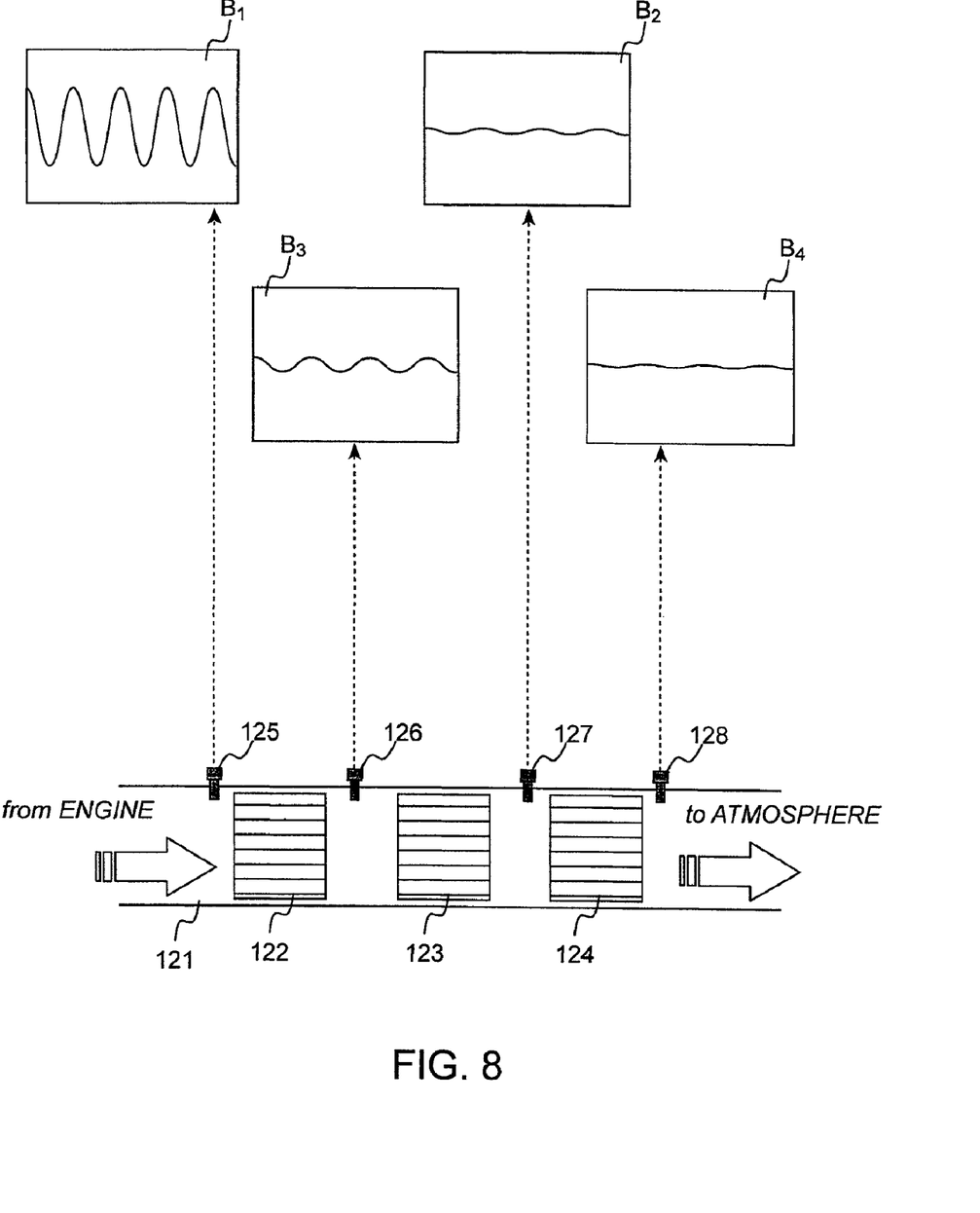
FIG. 8 is a structural view illustratively showing a conventional technique about the catalyst degradation estimation.

However, in a case in which the degree of degradation of the three-way catalyst 102 is detected through the use of the method shown in FIGS. 6 and 7, there is a problem in that, if a plurality of three-way catalysts 122, 123 and 124 are disposed in series as shown in FIG. 8, difficulty is experienced in individually detecting the degree of degradation of each of the three-way catalysts 122, 123 and 124.

That is, as shown in FIG. 8, the first three-way catalyst 122, the second three-way catalyst 123 and the third three-way catalyst 124 are provided in the exhaust passage 121. Moreover, these first to third three-way catalysts 122, 123 and 124 are arranged in the order of the first three-way catalyst 122, the second three-way catalyst 123 and the third three-way catalyst 124 from the upstream side. Each of the first to third three-way catalysts 122, 123 and 124 contains an OSC adsorbent.

In addition, a first $O_2$ sensor 125 is located on the upstream side of the first three-way catalyst 122, and a second $O_2$ sensor is placed on the downstream side of the first three-way catalyst 122 and on the upstream side of the second three-way catalyst 123. Still additionally, a third $O_2$ sensor 127 is provided on the downstream side of the second three-way catalyst 123 and on the upstream side of the third three-way catalyst 124, and a fourth $O_2$ sensor 128 is put on the downstream side of the third three-way catalyst 123.

Accordingly, in the case of varying the exhaust air-fuel ratio periodically, the periodic variation of the exhaust air-fuel ratio is detectable by the first $O_2$ sensor 125 (see mark $B_1$ in FIG. 8).

Moreover, in a case in which the OSC adsorbent of the first three-way catalyst 122 does not fall into a degradation state, the OSC adsorbent of the first three-way catalyst 122 fulfills its function, thereby reducing the air-fuel ratio variation of the exhaust gas discharged from the first three-way catalyst 122 to the downstream side (see mark $B_2$ in FIG. 8). This can reduce the air-fuel ratio variation detected by the second $O_2$ sensor 126, the air-fuel ratio variation by the third $O_2$ sensor 127 and the air-fuel ratio variation by the fourth $O_2$ sensor 128 (see marks $B_2$, $B_3$ and $B_4$ in FIG. 8). This makes it difficult to make a comparison on the difference between the results of detection by these second to fourth $O_2$ sensors 126, 127 and 128.

That is, in a case in which an upstream side catalyst (for example, the first three-way catalyst 122) is not in a degraded condition, a downstream side catalyst (for example, the second three-way catalyst 123 or the third three-way catalyst 124) cannot detect the degradation.

On the other hand, the catalyst includes various types of catalysts, and it can be hardly said that the technique disclosed in the above-mentioned patent document 1 is applicable to all the catalysts. In particular, difficulty is experienced in detecting the degradation of an HC trap catalyst (unburned fuel component adsorption catalyst) capable of adsorbing HC (hydro-carbon) which is an unburned fuel component in the exhaust gas.

That is, the HC in the exhaust gas, adsorbed by the HC trap catalyst, functions as a reductant to discharge oxygen adsorbed by the OSC adsorbent into the exhaust. Therefore, even if the technique disclosed in the patent document 1 is applied intact, it is difficult to estimate the degradation of the HC trap catalyst.

SUMMARY OF THE INVENTION

In accordance with an aspect of the present invention, there is provided a degradation estimating apparatus for an unburned fuel component adsorption catalyst, which is provided in an exhaust passage connected with an internal combustion engine and having an unburned fuel component adsorbent for adsorbing an unburned fuel component in exhaust gas emitted from the engine and an oxygen storage component for adsorbing oxygen in the exhaust gas, comprising: upstream air-fuel ratio detecting means for detecting an upstream air-fuel ratio in an upstream side of the catalyst; downstream air-fuel ratio detecting means for detecting a downstream air-fuel ratio in a downstream side of the catalyst; fuel cut means for suspending fuel supply to the engine which is in operation;

reductant increasing means, for increasing an amount of reductant in the exhaust gas beyond an amount of the reductant in a normal operation, in response to cancellation of the suspending fuel supply conducted by the fuel cut means; and degradation estimating means for estimating a degradation of the catalyst on the basis of a first term and a second term, the first term being a period of time, from the cancellation of the suspended fuel supply, until the upstream air-fuel detecting means detects a variation of the upstream air-fuel ratio due to the increase of the reductant quantity in the exhaust gas by the reductant increasing means, the second term being a period of time, from the cancellation of the suspended fuel supply, until the downstream air-fuel ratio detecting means detecting a variation of the downstream air-fuel ratio due to the increase of the reductant quantity in the exhaust gas by the reductant increasing means.

Thus, with a simple structure, estimating the degradation of an unburned fuel component adsorption catalyst can easily be made by further richening the exhaust air-fuel ratio with respect to an air-fuel ratio in a normal operation after the cancellation of the suspension of fuel supply (i.e., fuel cut) into an internal combustion engine which is in operation. In addition, this can shorten both the first term and second term which are periods of time needed for the estimating the degradation of the unburned fuel component adsorption catalyst.

BRIEF DESCRIPTION OF THE DRAWINGS

The present invention will be come more fully understood from the detailed description given hereinbelow and the accompanying drawings which are given by way of illustration only, and thus are not limitative of the present invention and wherein.

DETAILED DESCRIPTION OF THE INVENTION

With reference to the drawings, a description will be given hereinbelow of a degradation estimating apparatus for an unburned fuel component adsorption catalyst according to an embodiment of the present invention.

Figure 1:
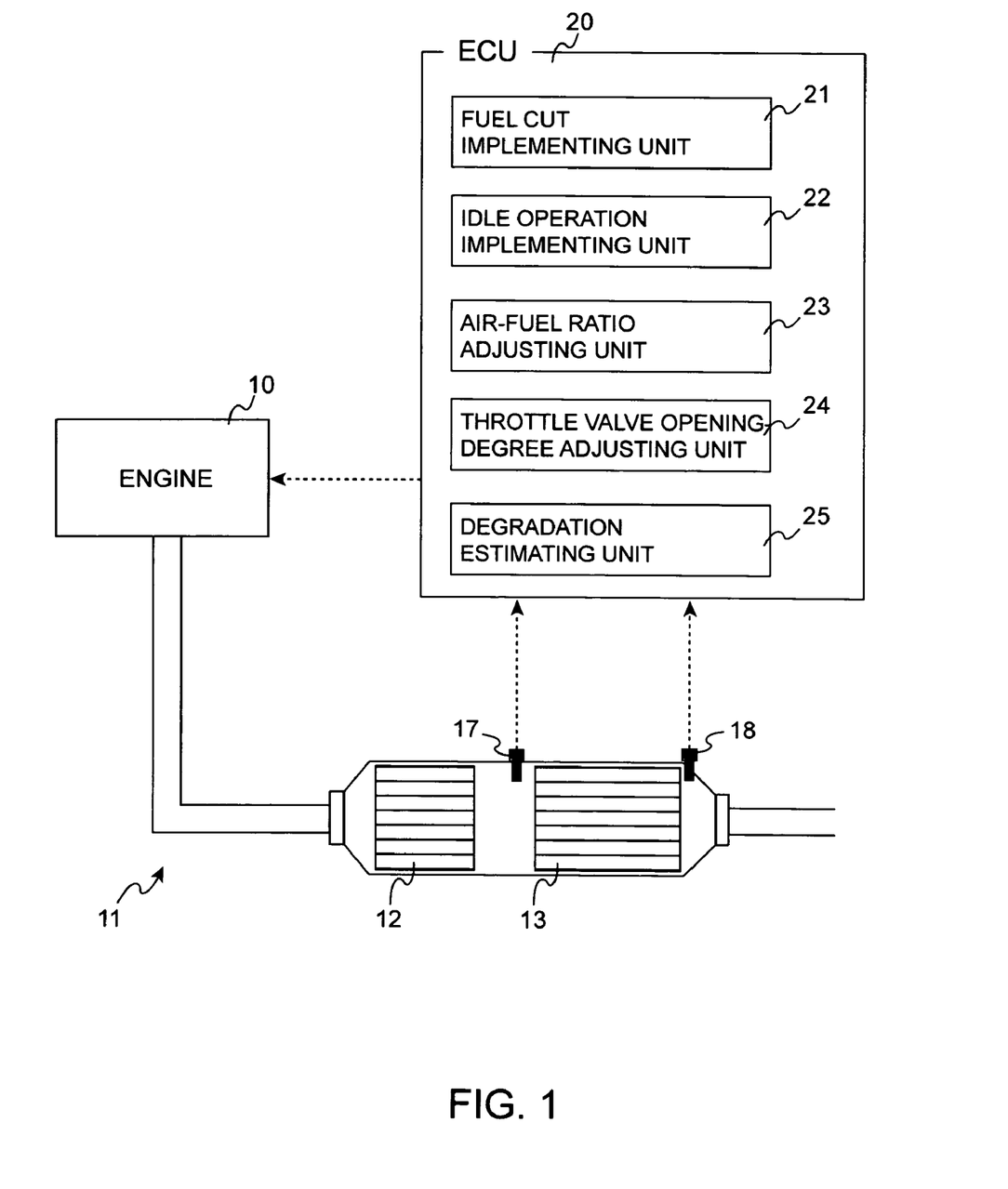
FIG. 1 is a block diagram illustratively showing the entire configuration of a degradation estimating apparatus for an unburned fuel component adsorption catalyst according to an embodiment of the present invention.

As FIG. 1 shows, to a gasoline engine (internal combustion engine) 10, there is connected an exhaust pipe (exhaust passage) 11 which is internally equipped with a three-way catalyst 12 and an HC trap catalyst 13.

When combustion is made at a theoretical air-fuel ratio in the engine 10, the three-way catalyst 12 carries out the exhaust gas purification by bringing about the chemical change from CO (carbon monoxide), HC (hydro-carbon) and NOx (nitrogen oxide), contained in the exhaust gas exhausted from the engine 10, to $N_2$ (nitrogen) and $H_2O$ (water).

The carrier of this three-way catalyst 12 is cordierite having a honeycomb structure, and a TWC layer made of a platinum-based component such as palladium or rhodium is applied and formed on an inner surface thereof. Moreover, this TWC layer contains cerium as an oxygen storage component (OSC adsorbent) capable of adsorbing oxygen contained in an exhaust gas.

Figure 2:
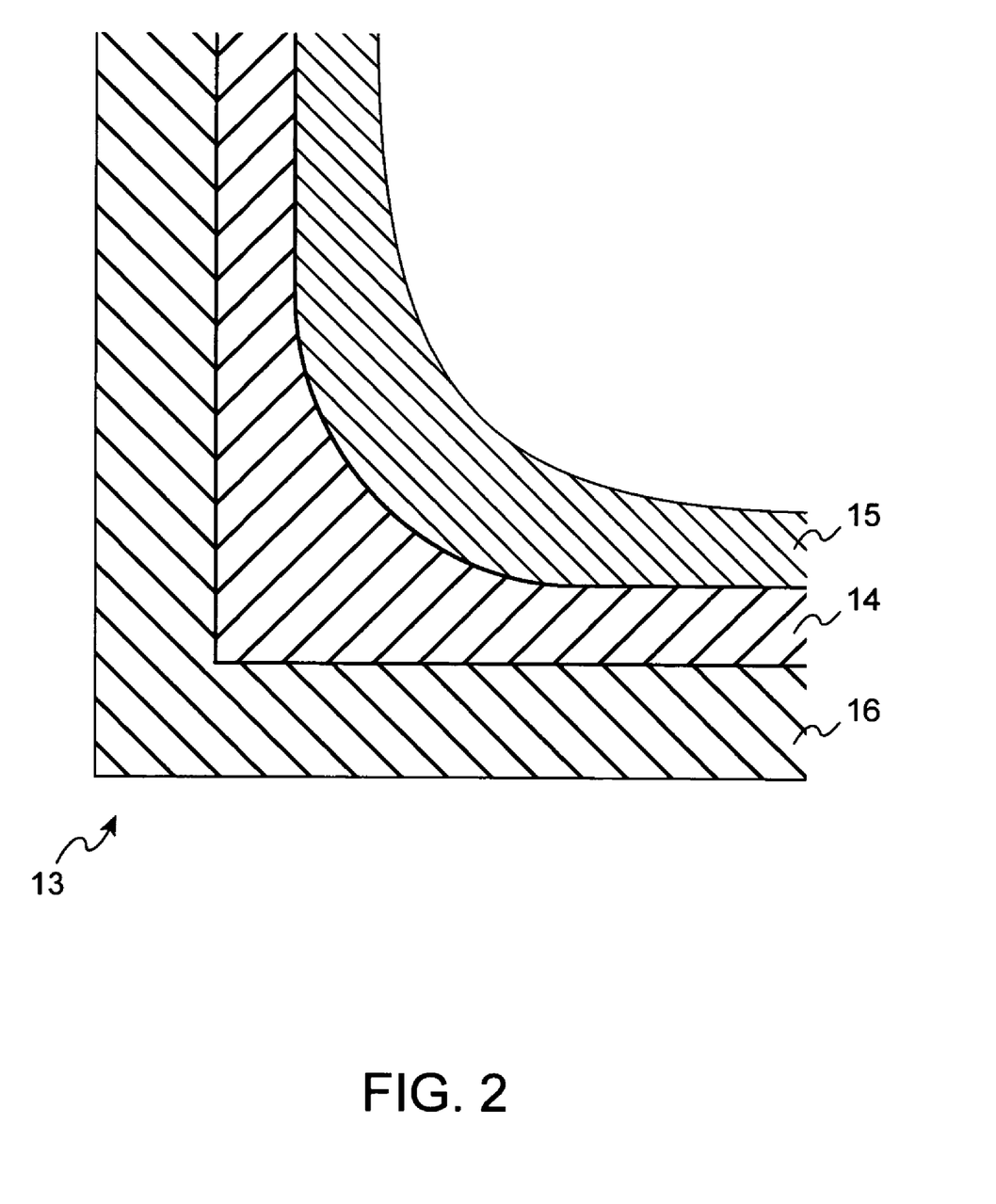
FIG. 2 is an illustrative view showing a structure of an essential part of a degradation estimating apparatus according to an embodiment of the present invention.

In addition, as shown in FIG. 2, the HC trap catalyst 13 is made up of a zeolite layer (unburned fuel adsorption component) 14 made to temporarily adsorb HC (unburned fuel component) contained in an exhaust gas and a TWC layer (oxygen absorbent) 15 containing cerium as an OSC absorbent. A carrier 16 of this HC trap catalyst is made of a cordierite having a honeycomb structure.

A more detailed description will be given hereinbelow of this HC trap catalyst 13. In the zeolite used as the unburned fuel component adsorbent, there are three-dimensionally formed pores each having a size corresponding to an outer diameter of the molecule of HC, thus adsorbing the molecules of HC with these pores.

Moreover, the zeolite layer 14' formed by applying the zeolite onto the carrier 16' can adsorb HC in the exhaust gas when the TWC layer 15 does not function because of a low exhaust gas temperature while discharging the adsorbed HC into the exhaust gas when the TWC layer 15 can function due to a rise of the exhaust gas temperature. At this time, the HC discharged from the zeolite layer 14 is chemically changed by the TWC layer 15 to $CO_2$ or $H_2O$, thereby rendering them harmless.

Still moreover, as shown in FIG. 1, an upstream side $O_2$ sensor (upstream side air-fuel ratio detecting means) 17 is provided on the upstream side of the HC trap catalyst 13 and in the vicinity of the entry thereof, and a downstream side $O_2$ sensor (downstream side air-fuel ratio detecting means) 18 is provided on the downstream side of the HC trap catalyst 13 and in the vicinity of the exit thereof. The exhaust air-fuel ratio at the entry of the HC trap catalyst 13, which is a result of the detection by the upstream side $O_2$ sensor 17, is referred to as an upstream side A/F (upstream side air-fuel ratio), while the exhaust air-fuel ratio at the exit of the HC trap catalyst 13, which is a result of the detection by the downstream side $O_2$ sensor 18, is referred to as a downstream side A/F (downstream side air-fuel ratio). These upstream side A/F and downstream side A/F are acquired fitly by an ECU 20.

This ECU 20 is an electronic control unit equipped with an interface, a CPU, a memory and other devices, which are not illustrated, and is designed to control the engine 10 on the basis of an upstream side oxygen quantity detected by the upstream side $O_2$ sensor 17 and a downstream side oxygen quantity detected by the downstream side $O_2$ sensor 18.

This ECU 20 includes a fuel cut implementing unit (fuel cut implementing means) 21, an idle operation implementing unit (idle operation implementing means) 22, an air-fuel ratio adjusting unit (reductant increasing means) 23, a throttle valve opening-degree adjusting unit (reductant increasing means, exhaust flow adjusting means) 24, and a degradation estimating unit (degradation estimating means) 25.

The aforesaid fuel cut implementing unit 21, idle operation implementing unit 22, air-fuel ratio adjusting unit 23, throttle valve opening-degree adjusting unit 24, and degradation estimating unit 25 are all realized with software.

The fuel cut implementing unit 21 is for suspending the fuel supply into the engine 10 which is in operation, i.e., implementing fuel cut, when a predetermined fuel cut implementation condition reaches satisfaction. Along the fuel cut implementation conditions, there are the condition that an acceleration pedal (not shown) depressing quantity is zero and the condition that the engine speed exceeds a predetermined value, and other conditions. The technique related to this fuel cut is already well known, and the detailed description will be omitted for brevity.

The idle operation implementing unit 22 is for placing the engine 10 into an idle operation when the acceleration pedal depressing quantity is zero. Concretely, the idle operation implementing unit 22 is made to carry out the on/off switching of the idle operation implementation according to an on/off state of an idle switch (not shown) which turns on in a case in which the acceleration pedal depressing quantity is zero.

The air-fuel ratio adjusting unit 23, after the cancellation of the fuel cut implementation by the fuel cut implementing unit 21, when the engine 10 under control of the idle operation implementing unit 22 is in an idle operation, increases the fuel injection quantity into the engine 10 in the idle operation beyond that in a normal idle operation, thereby placing the exhaust gas atmosphere into an oxygen shortage state (that is, richening the exhaust air-fuel ratio).

The throttle valve opening-degree adjusting unit 24, after the cancellation of the fuel cut implementation by the fuel cut implementing unit 21, when the engine 10 under control of the idle operation implementing unit 22 is in an idle operation, increases the idle engine speed beyond the idle engine speed in the normal idle operation, that is, increases the throttle valve opening-degree of the engine 10 in the idle operation to increase the intake air flow rate (flow volume), thereby enhancing the exhaust flow rate.

The degradation estimating unit 25 is for estimating the degradation of the HC trap catalyst 13. More concretely, the degradation estimating unit 25 is designed to, after the cancellation of the fuel cut implementation by the fuel cut implementing unit 21, when the engine 10 under control of the idle operation implementing unit 22 is in an idle operation, measure a period of time (first term $T_1$) from when the fact of the idle operation is detected until a variation of the upstream side A/F occurring due to the fuel cut cancellation is detected by the upstream side $O_2$ sensor 17.

In addition, simultaneously with the measurement of this first term $T_1$, the degradation estimating unit 25 measures a period of time (second term $T_2$) from when the fuel cut implemented by the fuel cut implementing unit 21 is canceled until a variation of the downstream side A/F occurring due to the fuel cut cancellation is detected by the downstream side $O_2$ sensor 18.

Still additionally, the degradation estimating unit 25 is designed to make estimation for the degradation of the HC trap catalyst 13 on the basis of a time difference $T_{def}$ between the aforesaid first term $T_1$ and the aforesaid second term $T_2$.

Yet additionally, the degradation estimating unit 25 is designed to make the degradation estimation for the HC trap catalyst 13 after the engine 10 continues the idle operation for the second term $T_2$ without making the degradation estimation when the engine 10 merely conducts the idle operation.

Although a detailed description will be given later, the degradation estimation for the HC trap catalyst 13 based on the time difference $T_{def}$ by the degradation estimating unit 25 is made as follows. That is, a large time difference $T_{def}$ signifies that it takes a long time until the air-fuel ratio variation due to the variation of the air-fuel ratio occurring on the upstream side of the HC trap catalyst 13 appears on the downstream side of the HC trap catalyst 13 and this case means that the OSC adsorbent contained in the HC trap catalyst 13 does not fall into a degradation state and performs a sufficient function.

Conversely, a small time difference $T_{def}$ signifies that the air-fuel ratio variation due to the variation of the air-fuel ratio occurring on the upstream side of the HC trap catalyst 13 appears immediately on the downstream side of the HC trap catalyst 13. Accordingly, this means that the OSC adsorbent contained in the HC trap catalyst 13 falls into a degradation state and shows an insufficient function.

Thus, taking note of the fact that not only the degree of degradation of the OSC adsorbent corresponds to the degree of degradation of the three-way catalyst but it also corresponds to the degree of degradation of the HC adsorption catalyst 13, when the time difference $T_{def}$ becomes a predetermined threshold $T_0$ and below, the degradation estimating unit 25 makes a decision that the HC trap catalyst 13 is in a degraded condition.

Incidentally, since the HC trap catalyst 13 adsorbs HC in the exhaust gas, in comparison with a common three-way catalyst, it is considered that the time needed for the discharge of oxygen from the OSC adsorbent becomes longer. However, in this embodiment, prior to the degradation estimation for the HC trap catalyst 13 by the degradation estimating unit 25, the air-fuel ratio adjusting unit 23 richens the exhaust air-fuel ratio and the throttle valve opening-degree adjusting unit 24 increases the flow rate of the richened exhaust gas. Therefore, the degradation estimating unit 25 can appropriately make estimation on the degradation of the HC trap catalyst 13.

The degradation estimating apparatus according to an embodiment of the present invention, configured as described above, can provide the following effects and advantages.

Figure 3:
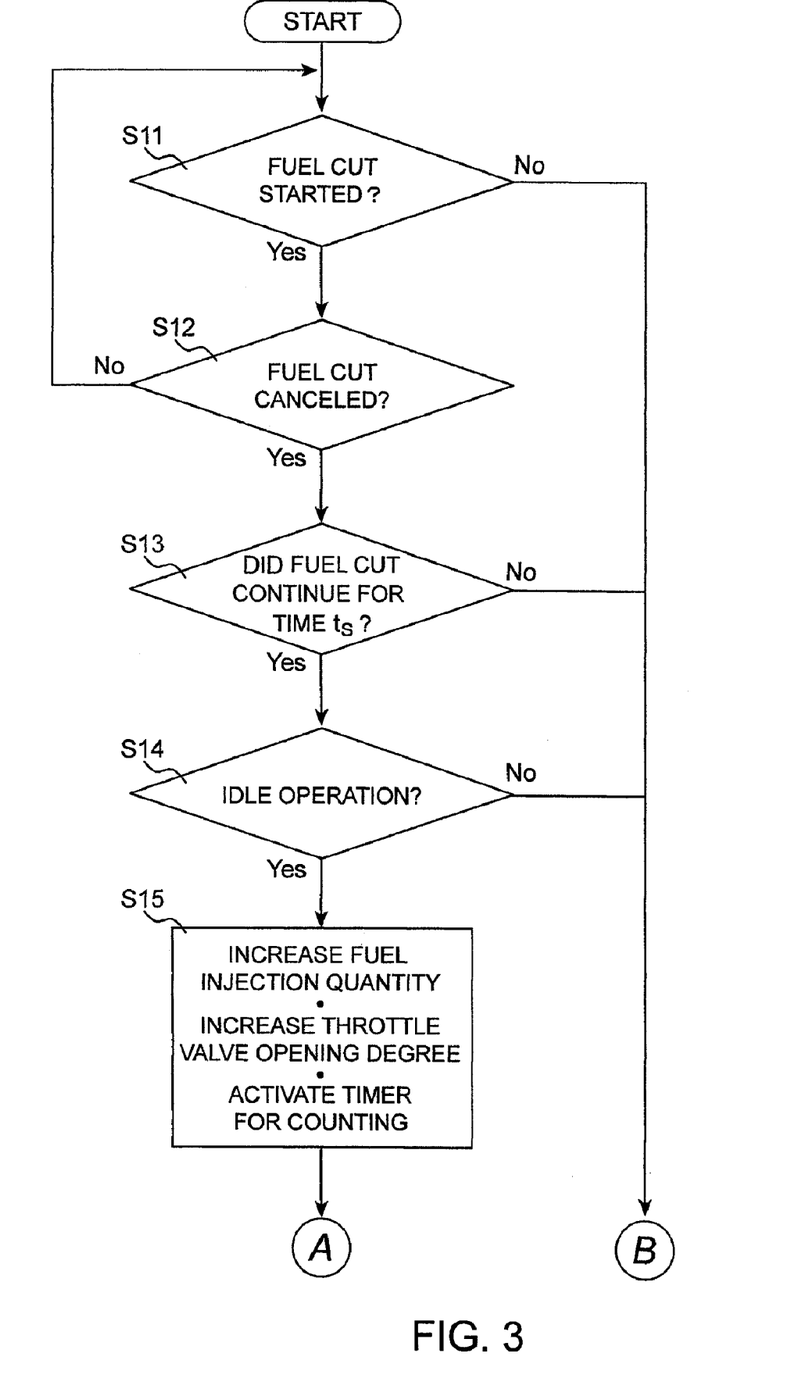
FIG. 3 is a flow chart showing an operation of a degradation estimating apparatus according to an embodiment of the present invention.

In FIG. 3, in step S11, a decision is made as to whether or not the fuel supply to the engine 10 in operation has been suspended by the fuel cut implementing unit 21, that is, whether or not the fuel cut has been carried out, then followed by step S12 for making a decision on whether or not the implementation of this fuel cut has been canceled. At this time, the decisions in steps S11 and S12 are repeatedly made until the cancellation of the fuel cut implementation is detected (No route of step S12).

Figure 5:
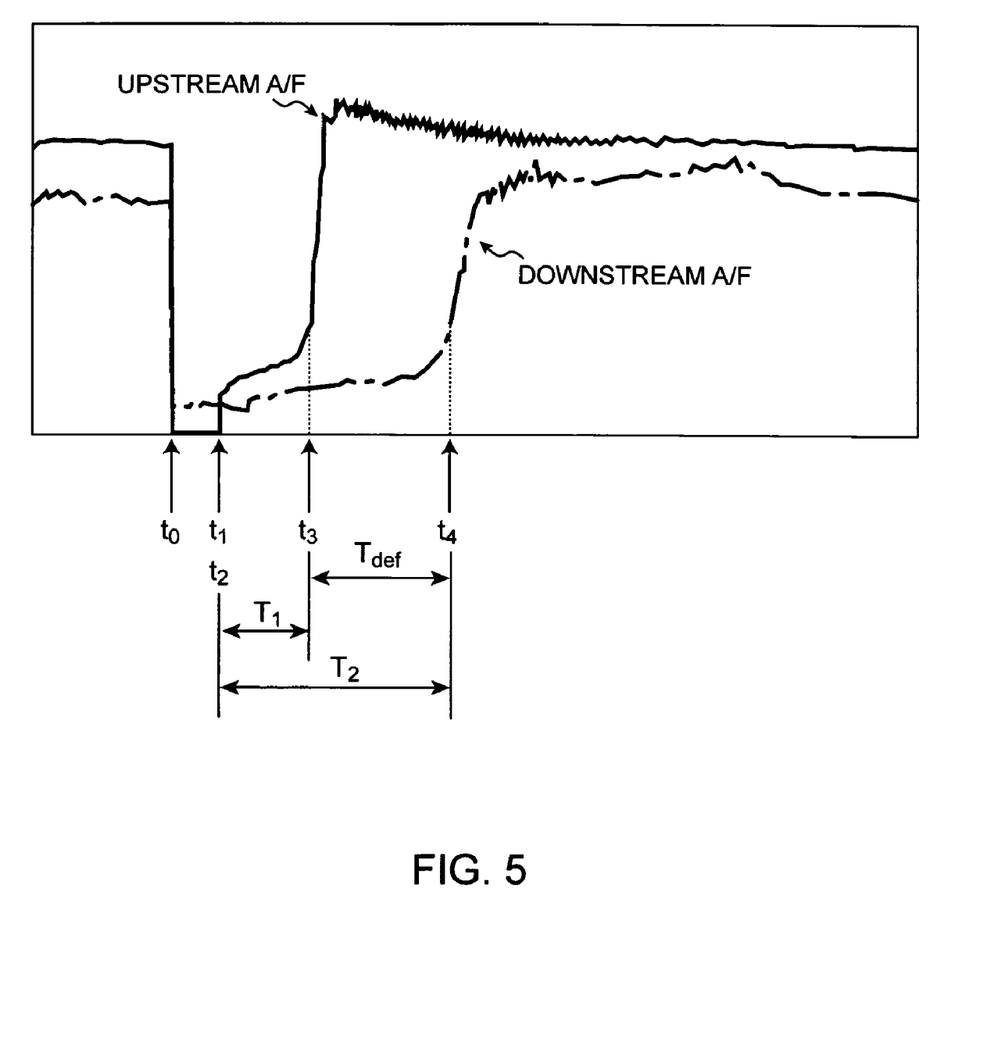
FIG. 5 is a graphic diagram illustratively showing the transitions of an upstream side air-fuel ratio and a downstream side air-fuel ratio for explaining an operation of a degradation estimating apparatus according to an embodiment of the present invention.

If the decision shows the cancellation of the fuel cut (Yes route of step S12), a decision is then made as to whether or not this fuel cut has continued for a predetermined time $t_s$ (step S13). In FIG. 5, the time indicated by mark $t_0$ represents the time point of the start of the fuel cut while the time indicated by mark $t_1$ depicts the time point of cancellation of the fuel cut.

The meaning of the decision in step S13 is to make estimation as to whether or not oxygen is sufficiently adsorbed by the OSC adsorbent of the HC trap catalyst 13. That is, the exhaust air-fuel ratio during the fuel cut is in a lean state and, when the exhaust gas having a lean atmosphere is continuously supplied to the HC trap catalyst 13, the OSC adsorbent contained in the HC trap catalyst 13 is filled up with oxygen up to the full adsorption capacity thereof.

Moreover, the predetermined time $t_s$ is previously obtained as a time needed for the supply of the oxygen of a quantity reaching the oxygen adsorption capacity of the OSC adsorbent contained in the HC trap catalyst 13, to the HC trap catalyst 13.

If the decision in step S13 indicates the continuation of the fuel cut for the predetermined time $t_s$ (Yes route), a decision is made as to whether or not the engine 10 under control of the idle operation implementing unit 22 is in an idle operation (step S14). The degradation estimating unit 25 carries out the above-mentioned decisions from S11 to S14. The degradation estimating unit 25 carries out the Above-mentioned decision from S11 to S14.

Step S14 decision of the engine 10 being in an idle operation (Yes route of step S14) signifies that the exhaust air-fuel ratio which was in a lean state (which stands at a lean value) due to the fuel cut suddenly changes to a rich state (rich value), that is, that oxygen in the exhaust gas dramatically decreases.

In response to the Yes decision in step S14, the air-fuel ratio adjusting unit 23 executes control so that an injector (not shown) of the engine 10 injects a larger quantity of fuel than that in a normal idle operation and the throttle valve opening-degree adjusting unit 24 executes control so that a throttle valve (not shown) of the engine 10 takes a larger opening degree than that in the normal idle operation.

At this time, furthermore, the degradation estimating unit 25 activates a timer (not shown) to start a time measuring operation simultaneously with the increase of the fuel injection quantity and the increase of the throttle valve opening degree (step S15).

FIG. 5 shows concrete examples of upstream side A/F detected by the upstream side $O_2$ sensor 17 and downstream side A/F detected by the downstream side $O_2$ sensor 18. In FIG. 5, the upstream side A/F is indicated by a solid line while the downstream side A/F is indicated by an alternate long and short dash line. Moreover, in FIG. 5, mark to denotes the time point of the start of the fuel cut, mark $t_1$ depicts the time point of the cancellation of the fuel cut, mark $t_2$ designates the time point of the detection of the engine 10 being in an idle operation, mark $t_3$ represents the time point of a variation of the upstream side A/F stemming from the cancellation of the fuel cut being detected by the upstream side $O_2$ sensor 17, and mark $t_4$ indicates the time point of a variation of the downstream side A/F stemming from the cancellation of the fuel cut being detected by the downstream side $O_2$ sensor 18.

In the example shown in FIG. 5, at the time $t_1$ of the cancellation of the fuel cut, the idle switch turns on and the idle operation of the engine 10 starts and, hence, the fuel cut cancellation time point $t_1$ and the idle operation detection time point $t_2$ substantially become the same as each other.

Through the control in the step S15, the exhaust air-fuel ratio is further richened in comparison with that in the normal idle operation and the flow rate of the exhaust gas richened is further increased in comparison with that in the normal idle operation, which enables the oxygen adsorbed by the OSC adsorbent of the HC trap catalyst 13 to be discharged quickly into the exhaust gas.

That is, since the three-way catalyst 12 containing the OSC adsorbent is provided on the upstream side of the HC trap catalyst 13, the fuel cut by the fuel cut implementing unit 21 is canceled to richen the exhaust air-fuel ratio, prior to the discharge of the oxygen contained in the OSC adsorbent of the HC trap catalyst 13 into the exhaust gas, the oxygen adsorbed by the OSC adsorbent of the three-way catalyst 12 is discharged into the exhaust gas. Moreover, in this case, the delay of the detection of the upstream side A/F by the upstream side $O_2$ sensor 17 and the detection of the downstream side A/F by the downstream side $O_2$ sensor 18 is conceivable.

In addition, it is also considered that the richening of the exhaust air-fuel ratio is hindered due to the adsorption of HC of the exhaust gas by the zeolite layer 14 of the HC trap catalyst 13.

However, in this embodiment, since the air-fuel ratio adjusting unit 23 increases the fuel injection quantity beyond that in the normal idle operation, and the throttle valve opening-degree adjusting unit 24 increases the throttle valve opening degree beyond that in the normal idle operation, even in a case in which the oxygen adsorbed by the OSC adsorbent of the three-way catalyst 12 is discharged into the exhaust gas, it is possible to richen the air-fuel ratio of the exhaust gas to be supplied to the HC trap catalyst 12 and further to increase the flow rate thereof, thus enabling the oxygen contained in the OSC adsorbent of the HC trap catalyst 13 to be promptly discharged into the exhaust gas.

Figure 4:
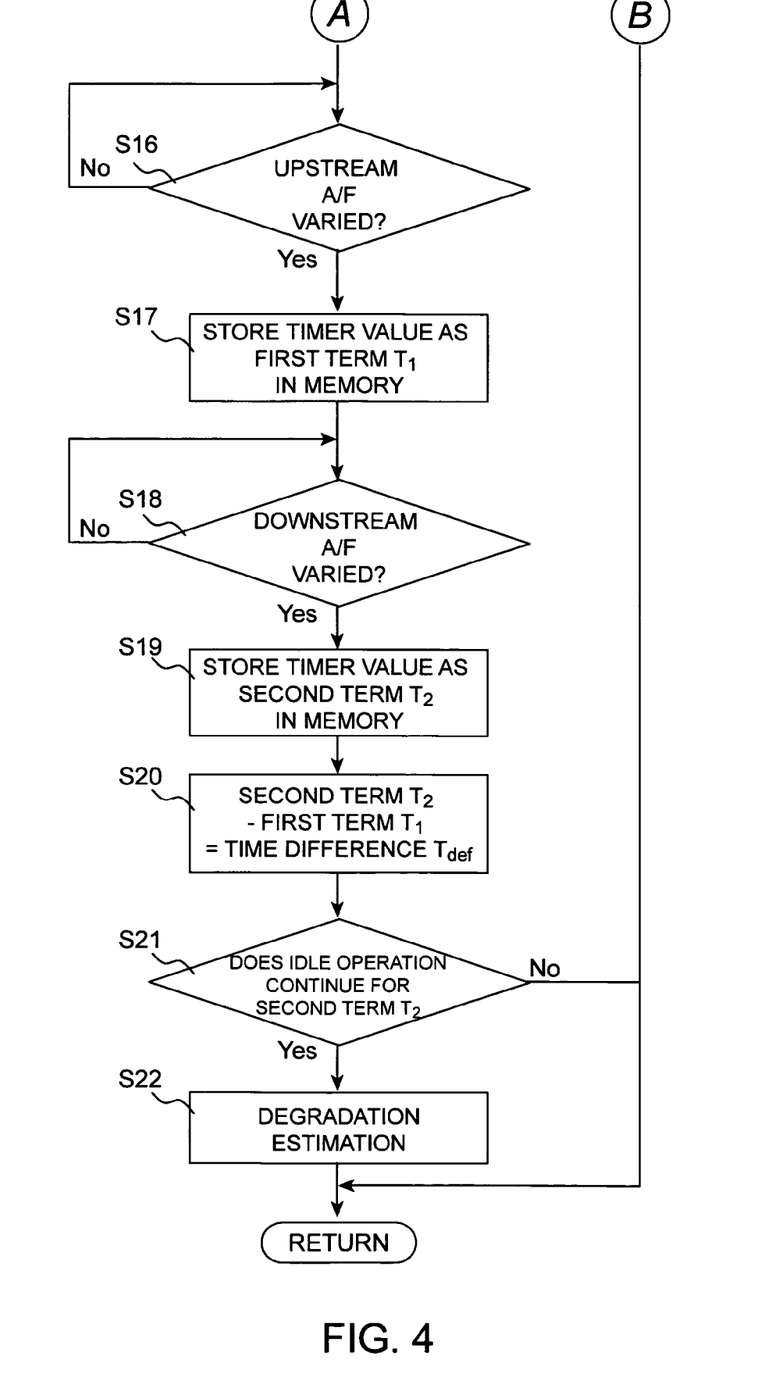
FIG. 4 is a flow chart showing an operation of a degradation estimating apparatus according to an embodiment of the present invention.

Furthermore, in step S16 of FIG. 4, a decision is made as to whether or not the upstream side A/F is varied due to the cancellation of the fuel cut (step S16). If this decision shows the variation of the upstream side A/F (Yes route), the degradation estimating unit 25 records the timer value $T_1$ at this time in a memory (step S17).

That is, as shown in FIG. 5, after the cancellation of the fuel cut (time point $t_1$), the timer value $T_1$ indicates a period of time (first term) from the time (time point $t_2$) of the detection of the engine 10 being in the idle operation to the time (time point $t_3$) of the detection of the variation of the upstream side A/F.

Following this, a decision is made as to whether or not the downstream side A/F is varied due to the cancellation of the fuel cut (step S18). If this decision shows the variation of the downstream side A/F (Yes route), the degradation estimating unit 25 records the timer value $T_2$ at this time in a memory (step S19). This timer value $T_2$ indicates a period of time (second term) from the cancellation of the fuel cut (time point $t_1$) through the time (time point $t_3$) of the detection of the engine 10 being in the idle operation to the time (time point $t_4$) of the detection of the variation of the downstream side A/F.

In addition, in step S20, the degradation estimating unit 25 subtracts the timer value $T_1$ recorded in the memory from the timer value $T_2$ recorded therein, thereby calculating a time difference $T_{def}$ which is from the detection of the variation of the upstream side A/F due to the cancellation of the fuel cut to the detection of the variation of the downstream side A/F.

At this time, the degradation estimating unit 25 makes a decision as to whether or not the idle operation of the engine 10 has continued for the second term $T_2$ (step S21). If the engine 10 has continued the idle operation for the second term $T_2$ (Yes route), on the basis of the time difference $T_{def}$ obtained in step S20, a decision is made as to whether or not the HC trap catalyst 13 is in a degraded condition (step S22).

That is, a large magnitude of this time difference $T_{def}$ signifies that it takes a long time until the variation of oxygen quantity arising on the upstream side of the HC trap catalyst 13 occurs on the downstream side of the HC trap catalyst 13. Accordingly, in this case, the degradation estimating unit 25 estimates that the OSC adsorbent contained in the HC trap catalyst 13 sufficiently fulfills its function without degrading.

Conversely, a small magnitude of this time difference $T_{def}$ signifies that the variation of oxygen quantity arising on the upstream side of the HC trap catalyst 13 appears immediately on the downstream side of the HC trap catalyst 13. Accordingly, in this case, the degradation estimating unit 25 estimates that the OSC adsorbent contained in the HC trap catalyst 13 cannot sufficiently fulfill its function because of degradation.

Furthermore, in step S22, when the time difference $T_{def}$ obtained in step S20 becomes below a predetermined threshold, the degradation estimating unit 25 makes a decision that the HC trap catalyst 13 is in a degraded condition. In this case, the threshold is a value previously obtained through experiments. Moreover, if the estimation of the degradation of the HC trap catalyst is made when the time difference $T_{def}$ becomes below the threshold a predetermined number of times (plural times), a more accurate estimation becomes feasible. Still moreover, the operational flow returns if the decision in step S11 of FIG. 3 shows that the fuel cut does not start yet (No route), if the decision in step S13 shows that the fuel cut does not continue for the predetermined time $t_s$ (No route), if the decision in step S14 indicates that the engine 10 is not in the idle operation (No route), or if the decision in step S21 of FIG. 4 indicates that the idle operation does not continue for the second term $T_2$.

As described above, with a degradation estimating apparatus according to the embodiment of the present invention, the estimation for the degradation of the HC trap catalyst 13 can easily be made with a simple structure by further richening the exhaust air-fuel ratio beyond an air-fuel ratio in a normal operation after the cancellation of the suspension of fuel supply into the engine 10 which is in operation, i.e., after the cancellation of the fuel cut.

In addition, by further richening the exhaust air-fuel ratio beyond an air-fuel ratio in a normal operation after the cancellation of the fuel cut, it is possible to shorten both the first term $T_1$ and second term $T_2$ even if the OSC adsorbent of the HC trap catalyst 13 normally fulfills its function. This enables frequent degradation estimation for the HC trap catalyst 13, thus preventing the HC trap catalyst 13 from being used in a state degraded.

Still additionally, the fact that the engine 10 continues the idle operation for the second term $T_2$ is employed as a condition of the degradation estimation on the HC trap catalyst 13, and the degradation estimation for the HC trap catalyst 13 is made after the air-fuel ratio of the exhaust gas supplied to the HC trap catalyst 13 becomes constant, thereby enhancing the degradation estimation accuracy.

Yet additionally, even in a case in which the catalyst 12 having a function (OSC function) to adsorb oxygen in the exhaust gas is provided on the upstream side of the HC trap catalyst 13, a reliable estimation for the degradation of the downstream side HC trap catalyst 13 becomes feasible.

Moreover, as the condition of the degradation for the HC trap catalyst 13, the flow rate of the richened exhaust gas is further increased beyond that in the normal idle operation, thus further shortening the time needed for discharging the oxygen adsorbed by the OSC adsorbent of the HC trap catalyst 13 into the exhaust gas, which enables shortening the time needed for the estimation for the HC trap catalyst 13 and more frequently carrying out the degradation estimation for the HC trap catalyst 13.

In a case in which the setting is made such that the degradation estimation is made for each predetermined mileage, since the degradation estimation control is not executed until the motor vehicle travels by the predetermined mileage after the degradation estimation is once carried out, the frequency of the richening control for the degradation estimation control decreases. This can minimize the fuel consumption for the degradation estimation control.

Although the embodiment of the present invention has been described above, the present invention is not limited to the above-described embodiment, and it is possible to cover all changes and modifications of the embodiment of the invention herein which do not constitute departures from the spirit and scope of the invention.

Although the embodiment has mainly been described with respect to the estimation for the degradation of the HC trap catalyst, it is also appropriate that, when the estimation for the degradation is actually made, this fact is displayed as a warning on an instrument panel of a motor vehicle so as to call attention to the driver or a warning is given to the driver in the form of a warning sound.

In addition, in a case in which the time difference $T_{def}$ is longer than the threshold $T_0$ but close thereto, it is also appropriate that a warning to the effect that the purification performance of the HC trap catalyst approaches the lower limit thereof is given to the driver.

Still additionally, although in the above description of the embodiment the air-fuel ratio adjusting unit 23 richens the exhaust air-fuel ratio by increasing the fuel injection quantity through the injector of the engine 10, the present invention is not limited to this. For example, it is also appropriate that an injector is provided in the exhaust pipe so that the fuel is injected directly into the exhaust gas (so-called after-injection).

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A degradation estimating apparatus, comprising:
    an unburned fuel component adsorption catalyst, which is provided in an exhaust passage connected with an internal combustion engine and having an unburned fuel component adsorbent for adsorbing an unburned fuel component in exhaust gas emitted from the engine and an oxygen storage component for adsorbing oxygen in the exhaust gas;

upstream air-fuel ratio detecting means for detecting an upstream air-fuel ratio in an upstream side of said unburned fuel component adsorption catalyst;

downstream air-fuel ratio detecting means for detecting a downstream air-fuel ratio in a downstream side of said unburned fuel component adsorption catalyst;

fuel cut means for suspending fuel supply to said engine which is in operation;

idle operation implementing means for determining whether said engine is in an idle operation when said suspension of fuel supply to said engine has been canceled;

reductant increasing means, for increasing an amount of reductant in the exhaust gas beyond an amount of the reductant in a normal operation, in response to cancellation of the suspending fuel supply conducted by said fuel cut means and when said idle operation implementing means determines that said engine is in the idle operation; and degradation estimating means for estimating a degradation of said unburned fuel component adsorption catalyst on the basis of a first term and a second term, the first term being a period of time, from the cancellation of the suspended fuel supply, until said upstream air-fuel detecting means detects a variation of the upstream air-fuel ratio due to the increase of the reductant quantity in said exhaust gas by said reductant increasing means, and the second term being a period of time, from the cancellation of the suspended fuel supply, until said downstream air-fuel ratio detecting means detecting a variation of the downstream air-fuel ratio due to the increase of the reductant quantity in the exhaust gas by said reductant increasing means.

2. The degradation estimating apparatus according to claim 1, wherein,
said degradation estimating means estimates that said catalyst falls into a degraded state, if a difference between said first term and said second term is equal to or smaller than a threshold value.

3. The degradation estimating apparatus according to claim 1, wherein
said reductant increasing means increases the amount of reductant in the exhaust gas by making an air-fuel ratio of said exhaust gas rich.

4. The degradation estimating apparatus according to claim 3, further comprising:
exhaust flow adjusting means for increasing an amount of flow of said exhaust gas beyond an amount of flow of said exhaust gas in a normal operation after the cancellation of the suspended fuel supply conducted by said fuel cut means.

5. The degradation estimating apparatus according to claim 4, wherein
said reductant increasing means increases the amount of reductant in the exhaust by setting an idle speed during said second term higher than a normal idle speed.

6. The degradation estimating apparatus according to claim 5, wherein,
said degradation estimating means estimates that said catalyst falls into a degraded state, if a difference between said first term and said second term is equal to or smaller than a threshold value.

7. The apparatus for making an estimation for an unburned fuel component adsorption catalyst according to claim 1, further comprising:
exhaust flow adjusting means for increasing a flow rate of said exhaust gas beyond a flow rate in a normal operation after the cancellation of the suspended fuel supply conducted by said fuel cut means.

8. The degradation estimating apparatus according to claim 7, wherein
said reductant increasing means increases the amount of reductant in the exhaust by setting an idle speed during said second term higher than a normal idle speed.

9. The degradation estimating apparatus according to claim 8, wherein,
said degradation estimating means estimates that said catalyst falls into a degraded state, if a difference between said first term and said second term is equal to or smaller than a threshold value.

10. The degradation estimating apparatus according to claim 1, further comprising:
an oxygen adsorption catalyst, which has an oxygen storage component for storing oxygen in said exhaust gas, provided at the upstream side of said unburned fuel component adsorption catalyst in said exhaust passage of said engine.

11. The degradation estimating apparatus according to claim 10, wherein
said reductant increasing means increases the amount of reductant in the exhaust gas by making an air-fuel ratio of said exhaust gas rich.

12. The degradation estimating apparatus according to claim 11, further comprising:
exhaust flow adjusting means for increasing an amount of flow of said exhaust gas beyond an amount of flow of said exhaust gas in a normal operation after the cancellation of the suspended fuel supply conducted by said fuel cut means.

13. The degradation estimating apparatus according to claim 12, wherein
said reductant increasing means increases the amount of reductant in the exhaust by setting an idle speed during said second term higher than a normal idle speed.

14. The degradation estimating apparatus according to claim 13, wherein,
said degradation estimating means estimates that said catalyst falls into a degraded state, if a difference between said first term and said second term is equal to or smaller than a threshold value.

15. The degradation estimating apparatus according to claim 1, wherein
said degradation estimating means implements the degradation estimation of said catalyst upon an implementing condition that said idle operation implementing means keep the idle operation during said second term.

16. The degradation estimating apparatus according to claim 15, further comprising:
an oxygen adsorption catalyst, which has an oxygen storage component for storing oxygen in said exhaust gas, provided at the upstream side of said unburned fuel component adsorption catalyst in said exhaust passage of said engine.

17. The degradation estimating apparatus according to claim 16, wherein
said reductant increasing means increases the amount of reductant in the exhaust gas by making an air-fuel ratio of said exhaust gas rich.

18. The degradation estimating apparatus according to claim 17, further comprising:
exhaust flow adjusting means for increasing an amount of flow of said exhaust gas beyond an amount of flow of said exhaust gas in a normal operation after the cancellation of the suspended fuel supply conducted by said fuel cut means.

19. The degradation estimating apparatus according to claim 18, wherein
said reductant increasing means increases the amount of reductant in the exhaust by setting an idle speed during said second term higher than a normal idle speed.

20. The degradation estimating apparatus according to claim 19, wherein,
said degradation estimating means estimates that said catalyst falls into a degraded state, if a difference between said first term and said second term is equal to or smaller than a threshold value.

\* \* \* \* \*